(12) United States Patent
Zerwick

(10) Patent No.: US 8,947,551 B2
(45) Date of Patent: Feb. 3, 2015

(54) METHOD AND APPARATUS FOR FRAME ROTATION IN THE JPEG COMPRESSED DOMAIN

(75) Inventor: Adam Zerwick, Sacramento, CA (US)

(73) Assignee: Aptina Imaging Corporation, George Town (KY)

( * ) Notice: Subject to any disclaimer, the term of this patent is extended or adjusted under 35 U.S.C. 154(b) by 618 days.

(21) Appl. No.: 13/194,023

(22) Filed: Jul. 29, 2011

(65) Prior Publication Data

US 2013/0027584 A1  Jan. 31, 2013

(51) Int. Cl.
| | | |
|---|---|---|
| *H04N 5/228* | (2006.01) | |
| *H04N 5/235* | (2006.01) | |
| *H04N 5/76* | (2006.01) | |
| *G06K 9/32* | (2006.01) | |
| *H04N 5/262* | (2006.01) | |
| *H04N 1/387* | (2006.01) | |
| *H04N 5/232* | (2006.01) | |
| *H04N 1/41* | (2006.01) | |
| *H04N 19/88* | (2014.01) | |
| *H04N 19/60* | (2014.01) | |

(52) U.S. Cl.
CPC ........... *H04N 5/2628* (2013.01); *H04N 1/3877* (2013.01); *H04N 5/232* (2013.01); *H04N 5/2621* (2013.01); *H04N 1/41* (2013.01); *H04N 19/00927* (2013.01); *H04N 19/00775* (2013.01)
USPC .................. 348/222.1; 348/230.1; 348/231.6; 382/297

(58) Field of Classification Search
CPC ........ H04N 1/2112; G06T 3/60; G06T 3/602; G06T 3/606
USPC .......... 348/230.1, 231.6, 222.1; 382/296, 297
See application file for complete search history.

(56) References Cited

U.S. PATENT DOCUMENTS

| | | | |
|---|---|---|---|
| 7,822,296 B2 * | 10/2010 | Ishikawa et al. .............. | 382/305 |
| 7,935,994 B2 | 5/2011 | Wang et al. | |
| 2007/0102738 A1 | 5/2007 | Adkisson et al. | |
| 2008/0205782 A1 * | 8/2008 | Mao et al. ...................... | 382/249 |
| 2009/0208139 A1 * | 8/2009 | Ishikawa et al. .............. | 382/305 |
| 2010/0104221 A1 * | 4/2010 | Yeung et al. .................. | 382/297 |
| 2010/0254617 A1 * | 10/2010 | Hwang et al. ................. | 382/232 |
| 2010/0296747 A1 * | 11/2010 | Srinidhi ........................ | 382/239 |

* cited by examiner

*Primary Examiner* — Nhan T Tran
(74) *Attorney, Agent, or Firm* — Treyz Law Group; Kendall P. Woodruff

(57) ABSTRACT

An imaging system may include an image sensor array and circuitry that rotates and encodes images from the image sensor array. The circuitry may encode images from the image sensor into an image format such as a Joint Photographic Experts Group (JPEG) format. The circuitry may perform rotations of the images during encoding into Joint Photographic Experts Group (JPEG) format. Image rotations during encoding and compression may include redefining minimum coded units of the encoded image such that minimum coded units of a rotated image are processed in the same order as minimum coded units in a non-rotated image. Redefinition of minimum coded units may include rewriting of parameters in a start of frame segment of an image data stream such that the height and width of minimum coded units are reversed during rotation.

20 Claims, 8 Drawing Sheets

METHOD AND APPARATUS FOR FRAME ROTATION IN THE JPEG COMPRESSED DOMAIN

BACKGROUND

This relates to imaging systems and, more particularly, to imaging systems that produce rotated, compressed images.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

During operation, an electronic device having a digital image sensor may be held in a vertical or horizontal orientation when capturing images. It may therefore be desirable to provide electronic devices that produce JPEG images having vertical or horizontal orientations. Conventional JPEG images are coded into minimum coded units (MCUs). MCUs typically contain multiple blocks of image pixels. Conventional devices that provide JPEG images may produce JPEG images rotated into different orientations (e.g., vertical or horizontal) by decompressing the JPEG image, rotating the image, and re-compressing the image. Each JPEG compression results in loss of data and therefore loss of image quality. Some devices provide rotated JPEG images by rotating blocks of pixels and arranging MCUs in a rotated image such that each MCU in a rotated image contains different pixel blocks than the MCUs of a non-rotated image. Since MCUs are encoded differentially (i.e., encoded such that the encoding of one pixel block in an MCU depends on the prior encoding of another pixel block in the MCU), this change in the pixel blocks included in an MCU introduces a need for expensive processing and memory storage to account for the new differential encoding in the rotated image.

It would therefore be desirable to provide improved imaging systems that produce rotated JPEG images.

BRIEF DESCRIPTION OF THE DRAWINGS

FIG. 5 is a diagram showing illustrative mirroring and non-raster readout of image data from an image sensor in accordance with an embodiment of the present invention.

FIG. 6 is a diagram of an illustrative rotated image block having a counter-clockwise rotation of 90 degrees in accordance with an embodiment of the present invention.

DETAILED DESCRIPTION

Figure 1:
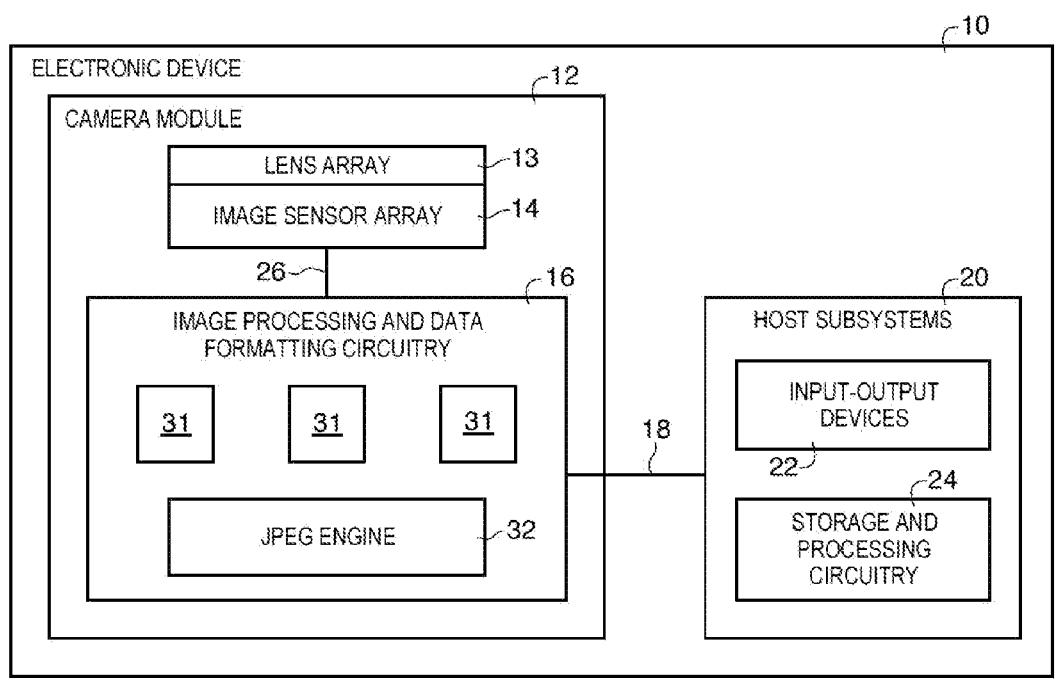
FIG. 1 is a diagram of an illustrative electronic device that may include a camera module with image processing and data formatting circuitry that produces rotated Joint Photographic Experts Group (JPEG) images in accordance with an embodiment of the present invention.

An electronic device with a camera module is shown in FIG. 1. Electronic device 10 may be a digital camera, a computer, a cellular telephone, a medical device, or other electronic device. Camera module 12 may include an array of image sensors such as image sensor array 14 and one or more lenses in a lens array such as lens array 13. During operation, one or more lenses of lens array 14 may be used to focus light onto image sensors of image sensor 14. Image sensor array 14 may include one or more arrays of photosensitive elements (i.e., pixels) that convert the light into digital data. Each pixel array may have any number of pixels (e.g., hundreds, thousands, millions, or more). A typical image sensor may, for example, a pixel array having millions of pixels (e.g., megapixels). Pixels in image sensor array 14 may include color filter elements formed over the photosensitive elements that filter the light. Pixels in image sensor array 14 may include microlenses that further focus the light through the color filter elements and onto the photosensitive elements of the image sensor.

The image sensors of image sensor array 14 may be formed on one or more separate semiconductor substrates. With one suitable arrangement, which is sometimes described herein as an example, the image sensors are formed on a common semiconductor substrate (e.g., a common silicon image sensor integrated circuit die). Each image sensor may be identical. For example, each image sensor may be a Video Graphics Array (VGA) sensor with a resolution of 480×640 sensor pixels (as an example). Other types of image sensor may also be used for the image sensors if desired. For example, images sensors with greater than VGA resolution or less than VGA resolution may be used, image sensor arrays in which the image sensors are not all identical may be used, etc. Some image sensors of image sensor array 14 may be sensitive to a single color of light (e.g., red light, green light, blue light, infrared light, etc.) while other image sensors of image sensor array 14 may be sensitive to a different color of light.

Still and video image data from image sensor array 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, image sensor array 14 and image processing and data formatting circuitry 16 are implemented on a common integrated circuit. The use of a single integrated circuit to implement image sensor array 14 and image processing and data formatting circuitry 16 can help to minimize costs.

Camera module 12 (e.g., image processing and data formatting circuitry 16) conveys acquired image data to host subsystems 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc. Storage and processing circuitry 24 may be used to store and decode rotated JPEG image data from camera module 12.

Image processing and data formatting circuitry 16 may include readout circuitry for reading out image data from image sensor array 14, processing circuitry for processing image data and JPEG compression circuitry for compressing and encoding image data in a JPEG standard format. Image processing and data formatting circuitry 16 may be formed from one or more separate integrated circuits or may be formed on a common integrated circuit die. Image processing and data formatting circuitry 16 may be formed separately from image sensor array 14 or, if desired, may be formed on a common integrated circuit die with image sensor array 14. Image processing and data formatting circuitry 16 may include memory such as one or more buffers for storing portions of an image. As an example, buffers such as buffers 31 may each be able to store image data from eight rows of image pixels in a pixel array. In one possible configuration that is sometimes described herein as an example, image processing and data formatting circuitry 16 may contain three read buffers each capable of storing eight lines of data (e.g., one buffer each for storing eight lines of data from three image data channels). Image processing and data formatting circuitry 16 may be configurable to read out pixels in a pixel array in a raster pattern (i.e., reading out pixels from left to right and from top to bottom), or may be configured to read out pixels in a non-raster order. Image processing and data formatting circuitry 16 or image sensor array 14 may be configured to read out image data in an order that results in storage of a mirrored image (i.e., an image that is reversed in one or more dimensions from an image of a real-world scene).

Image processing and data formatting circuitry 16 may perform operations such as pixel processing operations and color processing operations. Pixel processing may include, as examples, correction of dead pixels and de-noising operations. Color processing may include, as examples, white balance adjustments, exposure adjustments, and color matrix processing to convert images to a desired color space (e.g., a red-green-blue color space). Image processing and data formatting circuitry 16 may perform rotations of portions of image data collected by image sensor array 14. As an example, image processing and data formatting circuitry 16 may be configured to rotate 8 pixel by 8 pixel blocks of image data. Image processing and data formatting circuitry 16 may, as an example, include three buffers storing image data from three image data channels (e.g., color channels). Image processing and data formatting circuitry 16 include JPEG encoding circuitry such as JPEG engine 32. Image processing and data formatting circuitry 16 may provide rotated 8×8 image pixels blocks in three image data channels to JPEG engine 32.

Figure 2:
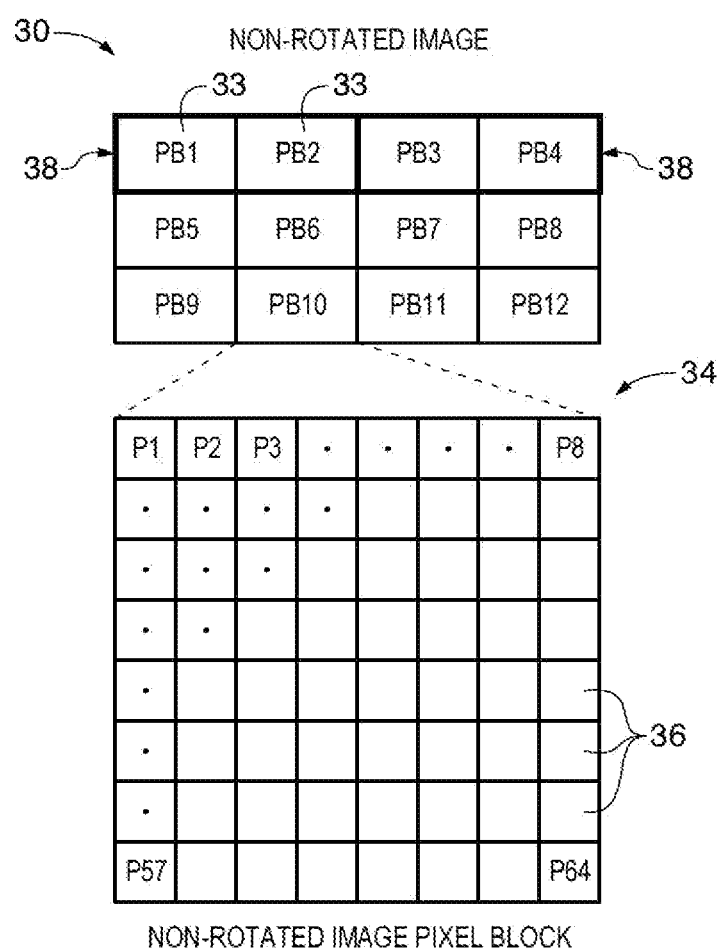
FIG. 2 is a diagram of illustrative image data that has been captured by an image sensor having pixel blocks arranged into minimum coded units in accordance with an embodiment of the present invention.

An example of image data that may be captured using image sensor array 14 of device 10 (see FIG. 1) is shown in FIG. 2. As shown in FIG. 2, non-rotated image 30 may contain one or more image pixel blocks such as image pixels blocks 33. In the example of FIG. 2, non-rotated image 30 contains 12 pixels blocks 33. This is merely illustrative. In practice, non-rotated image 30 may contain any number of pixel blocks 33. As shown in FIG. 2, pixels blocks may contain sixty four pixels such as pixels 36 arranged in an 8 pixel by 8 pixel (8×8) blocks such as non-rotated image pixel block 34. For illustrative purposes, pixels 36 of non-rotated pixel block 34 are labeled with pixel numbers P1 through P64 (i.e., P1, P2, P3 . . . P6 . . . P64). Pixel blocks 33 of non-rotated image 30 may be non-rotated pixel blocks such as non-rotated pixel block 34 or may be rotated pixel blocks. Pixel blocks 33 of non-rotated image 30 may be arranged as shown in FIG. 2 in which pixel block PB1 is located at the top-left corner of non-rotated image 30, pixel block PB4 is located at the top-right of non-rotated image 30, pixel block PB9 is located at the bottom-left corner of non-rotated image 30, pixel block PB12 is located at the bottom-right corner of non-rotated image 30, and intervening pixel blocks (i.e., pixel blocks PB2, PB3, PB5, PB6, PB7, PB8, PB10, and PB11) are arranged in increasing numerical order from left to right and top to bottom.

In a standard JPEG compression operation, 8×8 pixel blocks are combined to form minimum coded units (MCUs) such as MCUs 38. As shown in FIG. 2, MCUs 38 may contain two 8×8 image pixel blocks 33 (e.g., a first MCU includes image pixel blocks PB1 and PB2 and a second MCU includes pixel blocks PB3 and PB4). In a standard 4:2:2 JPEG compression scheme, a single MCU contains two 8×8 pixel blocks containing luminance (or brightness) information, one 8×8 pixel block containing reduced resolution red color-difference information and one 8×8 pixel block containing reduced resolution blue color-difference information. Combining two 8×8 pixel blocks containing luminance (or brightness) information, one 8×8 pixel block containing reduced resolution red color-difference information and one 8×8 pixel block containing reduced resolution blue color-difference information forms a 16×8 MCU that corresponds to 16×8 pixels of an image. Luminance data is conventionally called Y (or luma) data while red and blue color-difference image data are conventionally called Cr and Cb chroma image data respectively. Conventional JPEG compression requires that all MCUs contain an equal number of image pixels. Therefore, during compression operations, images must be padded by adding dummy (i.e., fake) pixels on the right and bottom edges of an image until the image contains enough pixels to fill the MCUs on the right and bottom edges of the image. In a conventional 4:2:2 JPEG compression scheme, this requires that an image be an integer multiple of 16 pixels in width and an integer multiple of 8 pixels in height. Conventional JPEG rotation schemes in which MCUs of a rotated image contain different pixel blocks (or pixel blocks in different orders) than MCUs of a non-rotated image therefore require padding on right and bottom edges of rotated images which may correspond to edges other than right and bottom edges of non-rotated images. This creates a requirement for multiple padding operations that can be computationally expensive.

Conventional JPEG encoding (i.e., discrete cosine transforming, quantization, and differential or Huffman encoding) of image data proceeds in a row-wise (i.e., left to right, top to bottom) encoding of pixel blocks in MCUs. As conventional JPEG encoding is differential (i.e., encoding of one pixel block depends on the encoding of the previous pixel block, it is to arrange image data using image sensor array 14 and image processing and data formatting circuitry 16 in such a way that MCUs and pixels in pixel blocks in a rotated image are processing in the same order as MCUs an pixels in pixel blocks in a non-rotated image. This arranging of data may be carried out in two steps: mirroring of a non-rotated image using the image sensor and rotation and non-raster readout of pixels in pixel blocks using the image processing and data formatting circuitry. Both mirroring of image data and rotation and non-raster readout of pixels in pixel blocks may be carried out differently for different rotations of an image (e.g., for counter-clockwise rotation an image, columns of image data may be reversed which for clockwise rotation, rows of image data may be reversed).

Figure 3:
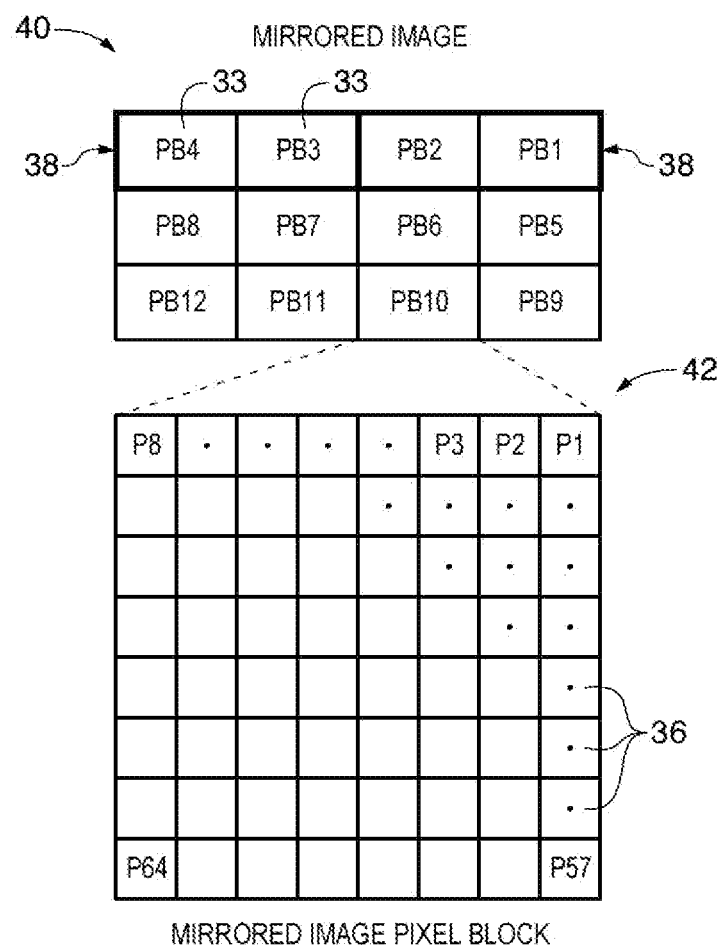
FIG. 3 is a diagram of illustrative mirrored image data from an image sensor in accordance with an embodiment of the present invention.

FIG. 3 shows mirrored image data that has been column-wise reversed in preparation for a counter-clockwise rotation. As shown in FIG. 3, mirrored image 40 is column-wise reversed with respect to non-rotated image 30 of FIG. 2. Pixel blocks 33 of mirrored image 40 may be arranged such that pixel block PB4 is located at the top-left corner of mirrored image 40, pixel block PB1 is located at the top-right of mirrored image 40, pixel block PB12 is located at the bottom-left corner of mirrored image 40, pixel block PB9 is located at the bottom-right corner of mirrored image 40, and intervening pixel blocks (i.e., pixel blocks PB2, PB3, PB5, PB6, PB7, PB8, PB10, and PB11) are arranged in decreasing numerical order from left to right and bottom to top.

In the example of FIG. 3, mirrored image 40 contains 12 pixels blocks 33. This is merely illustrative. In practice, mirrored image 40 may contain any number of pixel blocks 33. Pixels blocks 33 may contain sixty four pixels such as pixels 36 arranged in an 8 pixel by 8 pixel (8×8) blocks such as mirrored image pixel block 42. For illustrative purposes, pixels 36 of mirrored pixel block 42 are labeled with pixel numbers P1 through P64 (i.e., P1, P2, P3 ... P6 ... P64) as in FIG. 2. As compared with pixels 36 of non-rotated pixel block 34 of FIG. 2, pixels 36 of mirrored pixel block 42 are reversed (or mirrored) in a column-wise mirroring. Mirroring of image data may be carried out upon readout of an image from image sensor array 14 such that no non-rotated image is ever read out (i.e., the image may be initially read out from image sensor array 14 in a mirrored arrangement that is appropriate to the rotation to be carried out). Rotation and non-raster readout of pixels in mirrored pixel blocks such as mirrored pixel block 42 may be carried out on image data that has already undergone JPEG pre-processing steps.

Image processing and data formatting circuitry 16 may be used perform JPEG pre-processing steps including conversion of a Bayer color image to a red-green-blue (RGB) image and conversion of an RGB image to a YCbCr luminance-chrominance color space. Image processing and data formatting circuitry 16 may also be used to reduce the resolution of Cb and Cr chroma image data.

Figure 4:
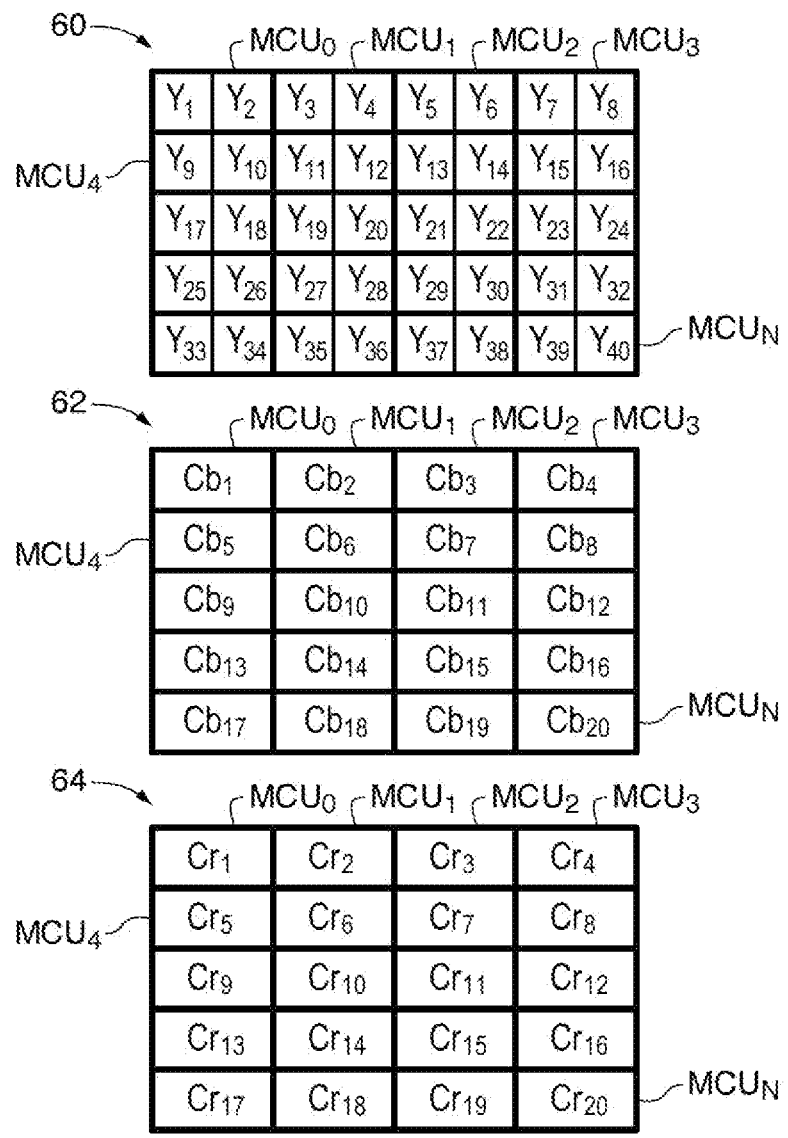
FIG. 4 is a diagram of image data undergoing conventional preprocessing for conventional Joint Photographic Experts Group (JPEG) compression.
Figure 5:
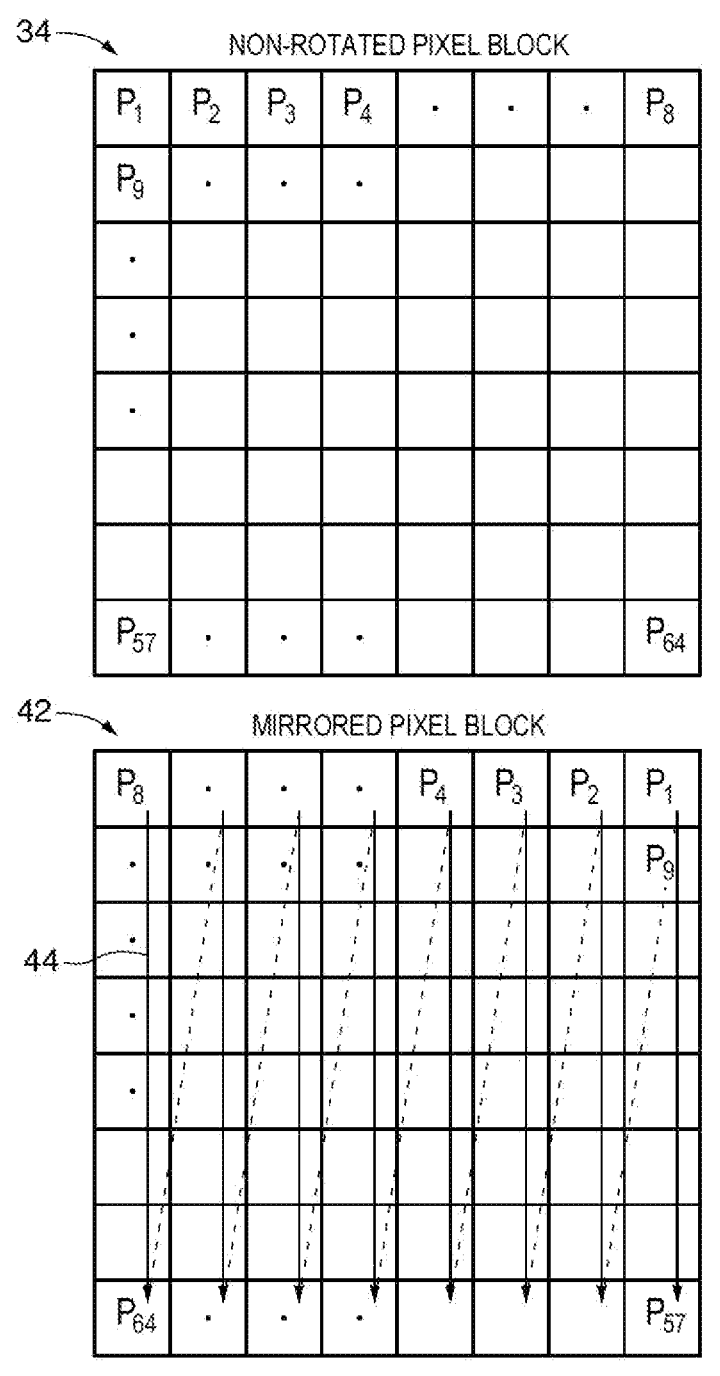

YCbCr image data that is used in conventional JPEG processing is shown in FIG. 4. In a conventional JPEG compression operation, image data is converted from a red-green-blue (RBG) color space to a luminance-chrominance color space (e.g., a YCbCr color space). In a YCbCr color space, Y indicates luminance (or image brightness) data, Cb and Cr indicate color difference components (i.e., blue difference (Cb) and red difference (Cr) image data) that are used to store color image data. Blue difference chroma image data Cb and red difference chroma image data Cr may be binned or otherwise smoothed so as to reduce the spatial resolution of the Cb and Cr images as shown in FIG. 5. As shown in FIG. 4, Y image 60 includes forty 8×8 blocks of image data labeled Y1 through Y40. Blue difference chroma image 62 (with 8×8 blocks of blue difference chroma image data labeled Cb1 through Cb20) has been reduced in resolution such that only one 8×8 block of blue difference chroma image data corresponds to two 8×8 blocks of Y image data. 8×8 blue difference chroma image data block Cb1 corresponds to two 8×8 Y image data blocks (Y1 and Y2). Similarly, red difference chroma image 64 has been reduced in resolution such that only one 8×8 block of red difference chroma image data (labeled Cr1 through Cr20) corresponds to two 8×8 blocks of Y image data. This conventional reduction of resolution of chroma image data by a factor of two in the horizontal direction is commonly referred to as a 4:2:2 JPEG compression.

In a conventional 4:2:2 JPEG compression operation, two 8×8 blocks of Y image data (e.g., blocks Y1 and Y2) are combined with a blue and a red difference chroma image block (e.g., Cb1 and Cr1) to form a minimum coded unit (MCU). As shown in FIG. 4, Y image data blocks Y1 and Y2, together with blue difference chroma image block Cb1 and red difference chroma image block Cr1 form minimum coded unit MCU0. Similarly, Y image data blocks Y3 and Y4, together with blue difference chroma image block Cb2 and red difference chroma image block Cr2 form minimum coded unit MCU1. All image data in Y image 60, Cb image 62 and Cr image 64 is grouped into MCUs such as MCU2, MCU3, MCU4, etc. Each MCU must have the same size for JPEG encoding. Images undergoing JPEG compression having a horizontal size that is not a multiple of 16 must therefore be padded (i.e., expanded with empty pixel values on the right of the image) to form an image that may be broken into an integer number of MCUs. Similarly, images undergoing JPEG compression having a vertical size that is not a multiple of 8 must therefore be padded on the bottom of the image.

Following JPEG pre-processing steps such as conversion of image data from image sensor array 14 (see FIG. 1) into Y, Cb, and Cr image data components with image processing and data formatting circuitry 16, image data may be processed separately in three channels (i.e., one channel for each of the Y, Cb, and Cr image data components). Each image data component (e.g., Y, Cb, and Cr) may be divided into 8×8 pixel blocks such as pixel blocks 33 of FIGS. 2 and 3. In a 4:2:2 JPEG compression and rotation operation, two Y component pixel blocks, one Cb component pixel block, and one Cr component pixel block may be combined to form a single MCU. Each pixel block may be mirrored and rotated independently from other pixel blocks. JPEG encoding of pixel blocks may depend on previous JPEG encoding of other pixel blocks.

Producing rotated JPEG images with image processing and data formatting circuitry 16 requires that the orientation of 8×8 pixel blocks from JPEG engine 32 must match the orientation of the desired rotated image. This requires that image data pixel blocks be read delivered to JPEG engine 32 with the desired orientation.

FIG. 5 is a diagram of an illustrative pixel block of a non-rotated image frame as captured using an image sensor array of the type shown in FIG. 1. As shown in FIG. 5, non-rotated pixel block 34 may be an 8 pixel by 8 pixel (8×8) block of pixels such as pixels P1, P2, P3 ... P8, P9 ... P64. Non-rotated pixel block 34 may represent an 8 pixel by 8 pixel block of single color image pixels (i.e., red image pixels, blue image pixels, green image pixels, etc.) may represent an 8×8 block of color difference image pixels (e.g., Cr image pixels, Cb image pixels, etc.) or may represent luminance image pixels (e.g., Y image pixels). Pixels P1, P2, P3 ... P8, P9 ... P64 of non-rotated pixel block 40 may be read out using image sensor array 14 in a manner that produces a mirrored image having mirrored image pixel blocks such as mirrored image pixel block 42.

Mirrored image pixel block 42 contains the same image pixel data as non-rotated image pixel block 34. However, mirrored image pixel block 42 has image pixel data arranged so as to be mirrored in a column-wise manner (i.e., rows of pixels P1, P2, P3 ... P8, P9 ... P64 are stored in the same order, while columns of pixels P1, P2, P3 ... P8, P9 ... P64 are stored in reverse order) with respect to non-rotated pixel block 34. Column-wise mirroring may be used for counter clock-wise rotations of an image (e.g., rotations of an image by −90 degrees from a non-rotated image). For clock-wise rotations of an image (e.g., rotations of an image by +90 degrees from a non-rotated image), a non-rotated image is mirrored row-wise. For 180 degree rotations of an image, an image may be mirrored in both a column-wise and row-wise manner. Image pixels within an image pixel block such as non-rotated pixel block 40 will be mirrored as shown in FIG. 5 during a mirroring operation. Additionally, pixel blocks themselves of a non-rotated image frame will be similarly reversed in a mirrored image frame.

After the pixel blocks of a non-rotated image frame have been reversed to form a mirrored image frame (and, image pixels of each image pixel block have been reversed as shown in FIG. 5), the pixels P1, P2, P3 . . . P8, P9 . . . P64 in each mirrored pixel block may be delivered to JPEG engine 32 in a non-raster order. Arrows 44 of FIG. 5 indicate the order in which pixel data is delivered to JPEG engine 32. Pixel data delivered to JPEG engine 32 as indicated by arrows 44 are delivered as if they were in raster order of a −90 degree (counter-clockwise) rotated image.

Figure 6:
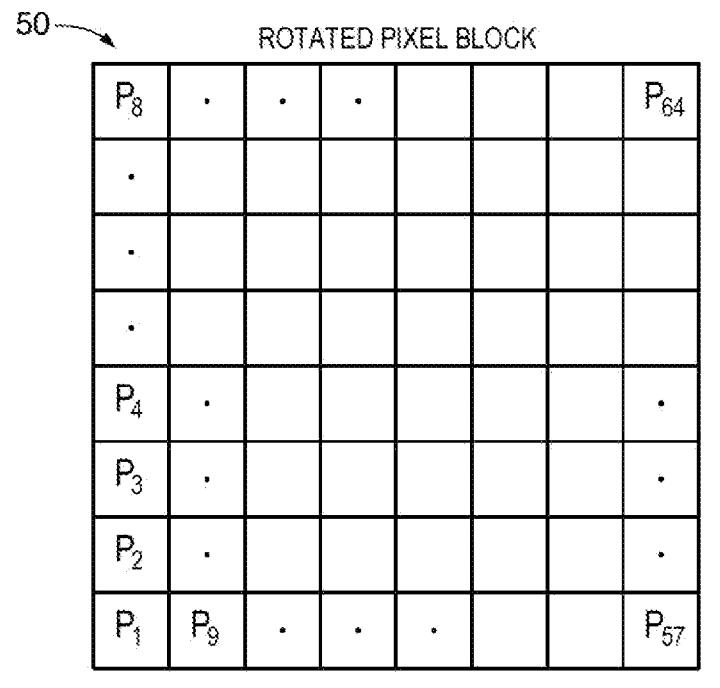

FIG. 6 shows an illustrative 8 pixel by 8 pixel rotated pixel block, delivered (as indicated by arrows 44 of FIG. 4) to JPEG engine 32. As shown in FIG. 4, pixels P1, P2, P3 . . . P8, P9 . . . P64 of rotated pixel block 50 are rotated by −90 degrees with respect to non-rotated pixel block 34. Rotated pixel blocks such as rotated pixel block 50 may be compressed and encoded into MCUs for the rotated image (using JPEG engine 32). JPEG encoded, rotated MCUs and delivered in a bit stream to host subsystems 20 via path 18 (see FIG. 1). A reconstruction index table (RIT) containing information on the size and data location of each MCU may be intermixed into the bit stream containing encoded MCUs that is delivered to host subsystems 20 via path 18. Reconstruction index tables (RITs) may be generated by JPEG engines such as JPEG engine 32 and may be used by host subsystems 20 to reconstruct a rotated JPEG image.

Conventional devices that produce rotated JPEG images construct MCUs corresponding to a rotated image that contain different groupings of pixel blocks than MCUs in a non-rotated image (i.e., pixel blocks delivered to JPEG engine 32 are not in the correct order for producing row-wise MCUs for a rotated image). Because JPEG encoding of pixel blocks in an MCU depend on the other pixel blocks in the MCU, this type of operation requires storage of information for each column of pixel blocks in a non-rotated image for use in constructing the MCUs of the rotated image. In particular, JPEG compression includes a discrete cosine transformation (DCT) of each pixel block in a non-rotated image. This results in a set of DCT coefficients for each pixel block in the non-rotated image. Because the pixel blocks in a row of pixel blocks in a non-rotated image become pixel blocks in a column of pixel blocks in a rotated image, at least one DCT coefficient must be stored for each pixel block in a row of pixel blocks in an non-rotated image. Typically the DC (or zeroth order) DCT coefficient is stored for each pixel block in a row of pixel blocks (i.e., a column of pixel blocks in the rotated image) and used to differentially encode the next column of pixel blocks in the rotated image. Moreover, because chroma image data (i.e., Cb and Cr image pixel blocks) are reduced in resolution, differentially encoding rotated chroma image data requires rearranging and interpolating chroma image data since each 8×8 chroma image block is a reduced resolution block corresponding to two particular Y image blocks. Changing the association of a chroma image block to correspond to a different pair of Y image blocks requires expensive computations to compensate for the change.

Figure 7:
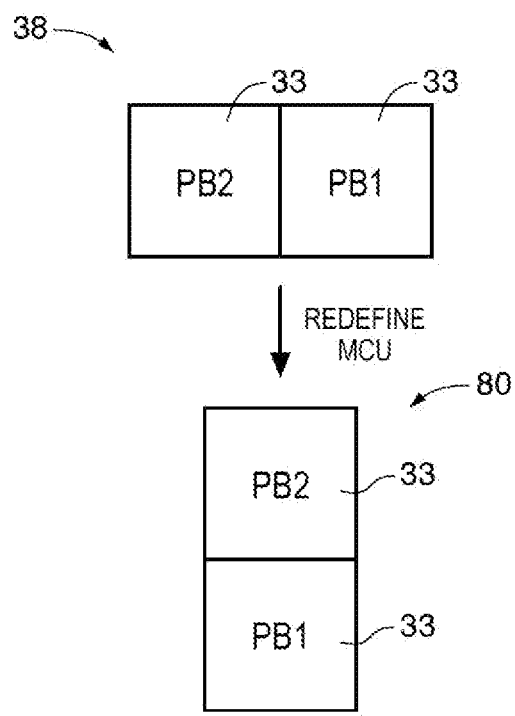
FIG. 7 is a diagram of an illustrative redefinition of a minimum coded unit (MCU) in a rotated JPEG image accordance with an embodiment of the present invention.

FIG. 7 is a diagram of an illustrative redefinition of an MCU that may help reduce the need for storage of DCT coefficients and for interpolation of chroma image data during production of rotated JPEG images using a device such as device 10 of FIG. 1. As shown in FIG. 7, MCU 38 may include two pixel blocks 33. Pixel blocks 33 may be pixel blocks such as pixel blocks PB2 and PB1 of mirrored image 40 of FIG. 3. MCU 38 may be defined using parameters of a start of frame (SOF) segment of a JPEG compressed image. In a 4:2:2 JPEG image, the SOF segment may contain configuration parameters as follows: HY=2, VY=1, HCb=1, VCb=1, HCr=1, VCr=1, where H and V in each parameter represent horizontal and vertical dimensions. Redefined MCU 80 of FIG. 7 may be defined by rewriting configuration parameters in the SOF segment as follows: HY=1, VY=2, HCb=1, VCb=1, HCr=1, VCr=1. This results in a vertically oriented MCU in which (in the example of FIG. 7), pixel block PB2 is stacked on top of pixel block PB1 and will be processed by any JPEG processing circuitry in the same order as horizontally oriented MCU 38 (i.e., PB1 is differentially encoded based on the prior encoding of PB2, providing that horizontally oriented MCU 38 has been appropriately mirrored for the desired rotation as described in connection with FIG. 3).

Figure 8:
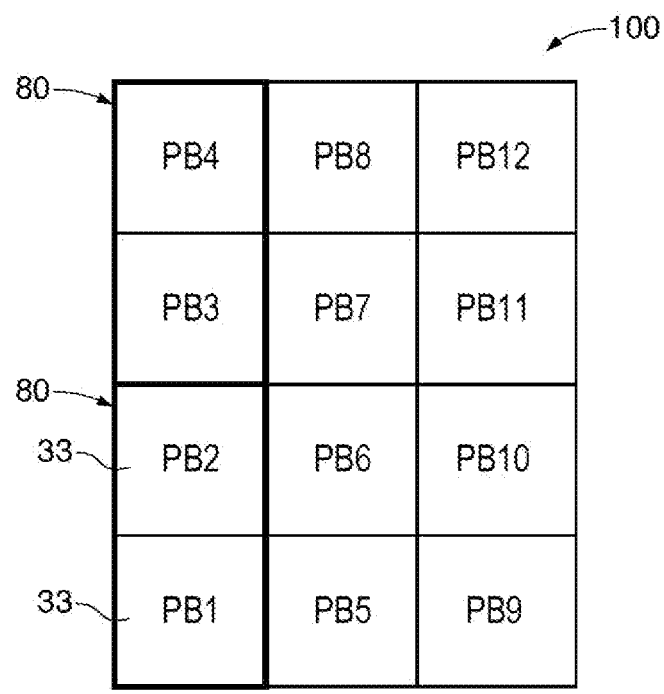
FIG. 8 is a diagram of an illustrative rotated JPEG image having redefined minimum coded units (MCUs) in accordance with an embodiment of the present invention.

Using the redefinition of MCUs as shown in FIG. 7, a rotated JPEG image may be reconstructed and stored using storage and processing circuitry 24 of host subsystems 20 of device 10 (see FIG. 1). As shown in FIG. 8, rotated JPEG image 100 may contain the same image blocks labeled PB1 through PB12 as mirrored image 40 of FIG. 3. Using the redefinition of MCUs described in connection with FIG. 7, pixel blocks of mirrored image 40 may delivered to JPEG engine 32 such that pixel blocks of each MCU are always delivered in the same order in which MCUs are reconstructed by storage and processing circuitry 24. In the example of FIG. 8, rotated JPEG image 100 contains twelve 8×8 vertical pixel blocks 33. Pixel blocks 33 are bundled into vertical MCUs 80 (e.g., a first MCU contains pixel blocks PB4 followed by pixel block PB3, and a second MCU contains pixel blocks PB2 followed by pixel block PB1, etc.). Referring back to FIG. 3, mirrored image 40 contains horizontal MCUs 38 that bundle the same pixel blocks in the same order as the vertical MCUs 80 of rotated image 100 (e.g., a first MCU contains pixel blocks PB4 followed by pixel block PB3, and a second MCU contains pixel blocks PB2 followed by pixel block PB1). Because MCUs 80 of rotated image 100 contain the same pixel blocks as MCUs 38 of mirrored image 40, padding of mirrored image 40 for completion of MCUs 38 need not be repeated for MCUs 80 of rotated image 100 as in a conventional production of rotated JPEG images. A single padding of the non-rotated or mirrored image is sufficient. Similarly, 8×8 chroma pixel blocks (e.g., Cr and Cb image pixel blocks) always correspond to the same two Y image blocks and therefore no interpolation of chroma component pixel blocks is required as in the conventional production of rotated JPEG images.

Conventional production of rotated JPEG images requires storage of DC DCT coefficients for each pixel block in a row of non-rotated pixel blocks. Re-defining MCUs as shown in FIGS. 7 and 8 reduces this requirement. For redefined MCUs such as MCUs 80, the DC coefficient of every other pixel block may be stored. This requires storage in the amount of ((# of blocks)/2)*(3 components)*(11 bits per coefficient). Another side effect of MCU redefinition is that restart markers (i.e., markers in the JPEG bit stream that reset the differential encoding) need to be placed in the stream by the host every other row of blocks in rotated image 100.

Storage and processing circuitry 24 of host subsystems 20 (see FIG. 1) may collect the RIT and JPEG encoded pixel blocks of a mirrored image such as mirrored image 40 and use the RIT to map redefined MCUs such as vertical MCUs 80 of FIGS. 7 and 8 to store a rotated JPEG compressed image such as rotated JPEG image 100.

Figure 9:
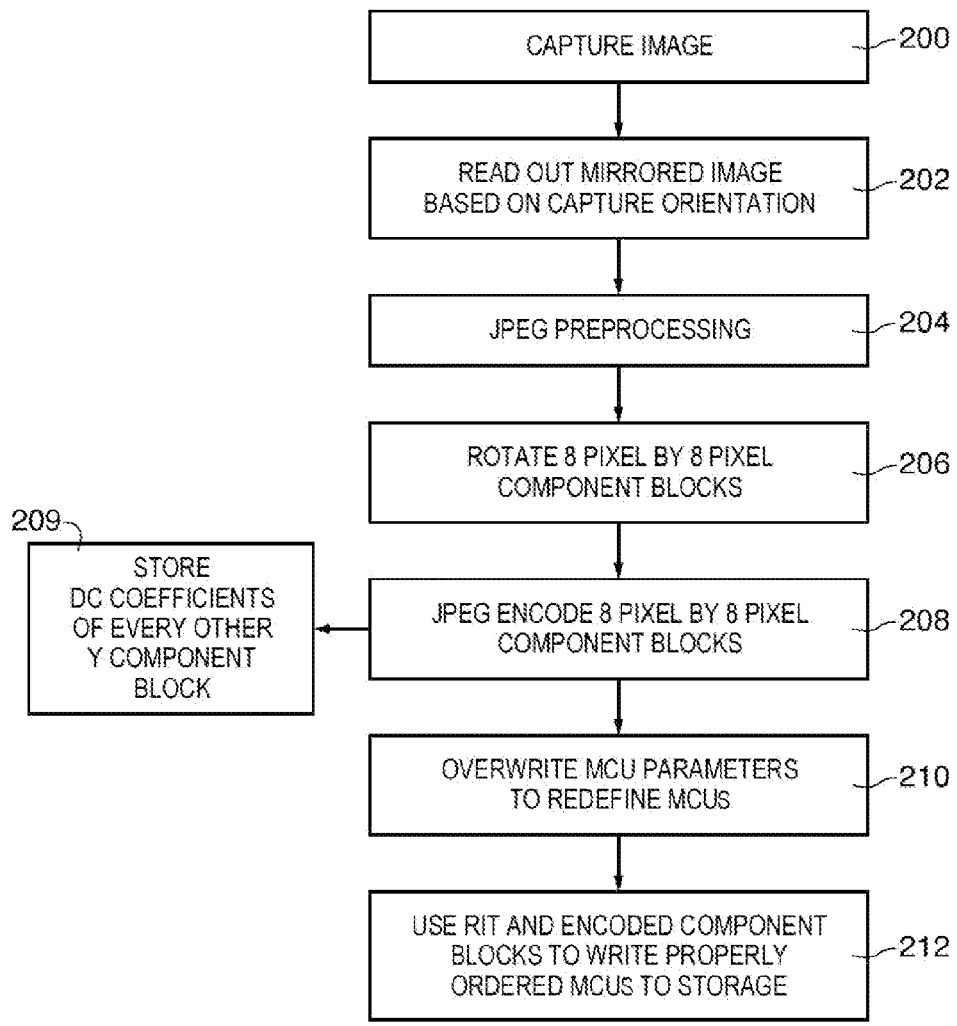
FIG. 9 is a flowchart showing illustrative steps involved in capturing and storing rotated JPEG images in accordance with an embodiment of the present invention.

FIG. 9 is a flowchart showing illustrative steps involved in producing rotated JPEG images such as image 100 of FIG. 8 using an electronic device of the type shown in FIG. 1.

At step 200, image sensor array 14 may be used to capture an image.

At step 202, image sensor array 14 may be used to readout the image. Reading out the image may include reading out the image in a standard raster order for non-rotated images or may include reading out the image in a row-wise, column-wise, or row-and-column-wise order for producing mirrored images for later rotation using image processing and data formatting circuitry 16 and host subsystems 20.

At step 204, image processing and data formatting circuitry may be used for JPEG pre-processing of the image. JPEG pre-processing may include transformation of the image from a Bayer color image to an RGB image. JPEG pre-processing may include transformation of the image from an RGB color space to a YCrCb color space. JPEG pre-processing may include reduction of the resolution of chroma image data such as horizontal binning of Cr and Cb chroma image data to reduce the resolution of the chroma image data by a factor of two.

At step 206, image processing and data formatting circuitry may be used to rotate 8×8 Y, Cb, and Cr pixel blocks and to deliver rotated 8×8 pixel blocks to JPEG engine 32.

At step 208, JPEG engine 32 may be used to JPEG encode (i.e., discrete cosine transform, quantize, and differentially or Huffman encode) each 8×8 image pixel block. As shown in box 209, JPEG encoding step 208 may include storage of DC DCT coefficients for every other Y component 8×8 pixel block.

At step 210, JPEG engine 32 may be used to redefine the MCUs by overwriting MCU defining parameters in a start of frame (SOF) segment of the image data. In a 4:2:2 JPEG image, the SOF segment may contain configuration parameters as follows: HY=2, VY=1, HCb=1, VCb=1, HCr=1, VCr=1, where H and V in each parameter represent horizontal and vertical dimensions. Redefined MCU 80 of FIG. 7 may be defined by rewriting configuration parameters in the SOF segment as follows: HY=1, VY=2, HCb=1, VCb=1, HCr=1, VCr=1.

At step 212, storage and processing circuitry 24 of host subsystems 20 may collect each entry of a reconstruction index table (RIT) included in a bit stream containing the JPEG encoded MCUs. After all entries of the RIT are collected, storage and processing circuitry 24 may use each entry of the RIT to place a corresponding MCU of the rotated image in an appropriately offset memory storage location. Step 212 may be repeated until all entries of the RIT have been used to place all MCUs of the rotated image.

Various embodiments have been described illustrating imaging systems that produce rotated JPEG images. Imaging systems may include electronic devices having image sensor arrays and circuitry. Image sensor arrays may capture non-rotated images. Image sensor arrays may read out mirrored images that arrange image data for later rotation using image processing and data formatting circuitry. Image processing and data formatting circuitry may rotate and encode images from the image sensor array. Image processing and data formatting circuitry may include a JPEG engine that encodes images from the image sensor into an image format such as a Joint Photographic Experts Group (JPEG) format. Image processing and data formatting circuitry may perform rotations of the images during encoding into Joint Photographic Experts Group (JPEG) format. Image rotations during encoding and compression may include redefining minimum coded units of the encoded image such that minimum coded units of an output rotated image are processed in the same order as minimum coded units of an input mirrored image. Redefinition of minimum coded units may include rewriting of parameters in a start of frame (SOF) segment of an image data stream such that the height and width of minimum coded units are reversed during rotation.

The foregoing is merely illustrative of the principles of this invention which can be practiced in other embodiments.

What is claimed is:

1. A method of producing rotated compressed images using an electronic device having an image sensor array and image processing and data formatting circuitry, comprising:
    with the image sensor array, capturing an image;
    with the image processing and data formatting circuitry, performing preprocessing operations on the image to produce horizontal minimum coded units having luminance and chrominance pixel blocks;
    with the image processing and data formatting circuitry, forming a data stream having a start of frame segment and the luminance and chrominance pixel blocks; and
    with the image processing and data formatting circuitry, overwriting parameters in the start of frame segment thereby changing the horizontal minimum coded units into vertical minimum coded units.

2. The method defined in claim 1 further comprising:
    with the image sensor array, mirroring the image.

3. The method defined in claim 2 wherein the image processing and data formatting circuitry includes at least one buffer for storing portions of the mirrored image, further comprising:
    with the at least one buffer, rotating the luminance and chrominance pixel blocks.

4. The method defined in claim 3 further comprising:
    with the image processing and data formatting circuitry, encoding the rotated luminance and chrominance pixel blocks.

5. The method defined in claim 4 wherein forming the data stream having a start of frame segment and the luminance and chrominance pixel blocks comprises:
    with the image processing and data formatting circuitry, forming the data stream having a start of frame segment and the rotated encoded luminance and chrominance pixel blocks.

6. The method defined in claim 5 wherein the image processing and data formatting circuitry further includes a Joint Photographic Experts Group engine and wherein encoding the rotated luminance and chrominance pixel blocks comprises encoding the luminance and chrominance pixel blocks in compliance with a Joint Photographic Experts Group standard.

7. The method defined in claim 6 wherein the electronic device further includes storage and processing circuitry, further comprising:
    with the image processing and data formatting circuitry, recording a reconstruction index table; and
    with the image processing and data formatting circuitry, providing the data stream to the storage and processing circuitry, wherein the data stream further includes the reconstruction index table.

8. The method defined in claim 7 further comprising:
with the image processing and data formatting circuitry, storing coefficients associated with at least some of rotated luminance pixel blocks.

9. The method defined in claim 8 wherein encoding the luminance and chrominance pixel blocks in compliance with the Joint Photographic Experts Group standard comprises:
with the Joint Photographic Experts Group engine, performing a discrete cosine transform on the luminance and chrominance pixel blocks.

10. The method defined in claim 9 wherein storing coefficients associated with at least some of rotated luminance pixel blocks comprises:
with the Joint Photographic Experts Group engine, storing a zeroth order coefficient associated with the discrete cosine transform of at least half of the rotated luminance pixel blocks.

11. The method defined in claim 10 further comprising:
with the storage and processing circuitry, extracting the reconstruction index table from the data stream.

12. The method defined in claim 11 further comprising:
with the storage and processing circuitry, mapping the vertical minimum coded units to storage locations determined using the reconstruction index table.

13. A method of producing rotated compressed images using an electronic device having an image sensor array and image processing and data formatting circuitry, comprising:
with the image sensor array, capturing an image;
with the image processing and data formatting circuitry, performing preprocessing operations on the image to produce horizontal minimum coded units of image data having luminance and chrominance pixel blocks; and
with the image processing and data formatting circuitry, storing a zeroth order coefficient associated with a discrete cosine transform of only a first half of the rotated luminance pixel blocks and discarding coefficients associated with a discrete cosine transform of a second half of the rotated luminance pixel blocks.

14. The method defined in claim 13 further comprising:
with the image processing and data formatting circuitry, forming a data stream having a start of frame segment, a reconstruction index table and the luminance and chrominance pixel blocks; and
with the image processing and data formatting circuitry, overwriting parameters in the start of frame segment changing the horizontal minimum coded units into vertical minimum coded units.

15. The method defined in claim 14 wherein the electronic device further includes storage and processing circuitry, further comprising:
with the image processing and data formatting circuitry, padding the image so that the image has a size that is equal to an integer number of the horizontal minimum coded units;
with the image processing and data formatting circuitry, providing the data stream to the storage and processing circuitry; and
with the storage and processing circuitry, mapping the vertical minimum coded units to storage locations determined using the reconstruction index table.

16. The method defined in claim 15 further comprising:
with the image sensor array, mirroring the image;
with the image processing and data formatting circuitry, rotating the luminance and chrominance pixel blocks; and
with the image processing and data formatting circuitry, delivering the rotated luminance and chrominance pixel blocks to a Joint Photographic Experts Group engine using a column by column readout order.

17. The method defined in claim 15 wherein the image processing and data formatting circuitry includes first, second, and third memory buffers, further comprising:
with the image sensor array, mirroring the image;
with the first memory buffer, rotating the luminance pixel blocks;
with the second memory buffer, rotating a first portion of the chrominance pixel blocks; and
with the third memory buffer, rotating a second portion of the chrominance pixel blocks.

18. The method defined in claim 17 further comprising:
with the Joint Photographic Experts Group engine, encoding the rotated luminance and chrominance pixel blocks in compliance with a Joint Photographic Experts Group standard, wherein each vertical minimum coded unit includes the same rotated encoded luminance and chrominance pixel blocks as at least one horizontal minimum coded unit.

19. An electronic device comprising:
a host subsystem configured to receive a data stream of encoded rotated blocks of image data, wherein each of the encoded rotated blocks of image data is differentially encoded with at least one additional encoded rotated block of image data in a vertical minimum coded unit; and
circuitry that produces the data stream of encoded rotated blocks of image data by rotating the blocks of image data, encoding the rotated blocks of image data, bundling the encoded rotated blocks of image data into the vertical minimum coded units, and providing the vertical minimum coded units to the host subsystem in the data stream.

20. The electronic device defined in claim 19 further comprising:
an image sensor array having image pixels that convert incident light into digital signals that are provided to the circuitry in an order that is reversed in at least one dimension with respect to the physical layout of the image pixels.

* * * * *